United States Patent
Jiang et al.

(10) Patent No.: US 12,429,879 B2
(45) Date of Patent: Sep. 30, 2025

(54) METHOD AND SYSTEM FOR CONTROLLING AUTONOMOUS MOBILE ROBOT, AND AUTONOMOUS MOBILE ROBOT

(71) Applicant: ECOVACS ROBOTICS CO., LTD., Jiangsu (CN)

(72) Inventors: Jiaxin Jiang, Jiangsu (CN); Junjie Shan, Jiangsu (CN); Kaili Xu, Jiangsu (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 247 days.

(21) Appl. No.: 17/926,132

(22) PCT Filed: Apr. 12, 2021

(86) PCT No.: PCT/CN2021/086582
§ 371 (c)(1),
(2) Date: Nov. 18, 2022

(87) PCT Pub. No.: WO2021/233007
PCT Pub. Date: Nov. 25, 2021

(65) Prior Publication Data
US 2023/0185306 A1 Jun. 15, 2023

(30) Foreign Application Priority Data
May 18, 2020 (CN) .......................... 202010421334.1

(51) Int. Cl.
G05D 1/00 (2024.01)
A47L 11/24 (2006.01)
A47L 11/40 (2006.01)

(52) U.S. Cl.
CPC ............ *G05D 1/0219* (2013.01); *A47L 11/24* (2013.01); *A47L 11/4011* (2013.01);
(Continued)

(58) Field of Classification Search
CPC .. G05D 1/0219; G05D 1/0088; G05D 1/0231; G05D 1/0214; A47L 11/24;
(Continued)

(56) References Cited

U.S. PATENT DOCUMENTS

2018/0116475 A1 5/2018 So et al.
2018/0210445 A1 7/2018 Choi et al.
(Continued)

FOREIGN PATENT DOCUMENTS

CN 107378953 A 11/2017
CN 108170137 A 6/2018
(Continued)

OTHER PUBLICATIONS

Chinese Office Action dated Feb. 11, 2023, as received in application No. 202180005420.7.
(Continued)

*Primary Examiner* — Abby Lin
*Assistant Examiner* — Esvinder Singh
(74) *Attorney, Agent, or Firm* — Maschoff Brennan

(57) ABSTRACT

The present disclosure discloses a method and system for controlling an autonomous mobile robot, and the autonomous mobile robot. The method includes: when cleaning in a current region, recognizing, by the autonomous mobile robot, information of a line object appearing in a cleaning path, where the information at least includes one of pose information of the line object, a length of the line object, and a cross-sectional radius of the line object; and determining a target control strategy matched with the recognized information from preset control strategies, and causing the autonomous mobile robot to execute the target control strategy.

18 Claims, 6 Drawing Sheets

(52) U.S. Cl.
CPC ........ *A47L 11/4061* (2013.01); *G05D 1/0088* (2013.01); *G05D 1/0231* (2013.01)

(58) Field of Classification Search
CPC .............. A47L 11/4011; A47L 11/4061; A47L 2201/00; A47L 2201/04; A47L 2201/06; A47L 9/009; G01S 17/89; G01S 17/931; B25J 5/007; B25J 9/1664; B25J 9/1666; B25J 9/1684; B25J 11/0085
See application file for complete search history.

(56) References Cited

U.S. PATENT DOCUMENTS

| | | | | |
|---|---|---|---|---|
| 2019/0184571 | A1* | 6/2019 | Hou | ............................ A47L 1/00 |
| 2019/0265718 | A1* | 8/2019 | Lee | .......................... G05D 1/661 |
| 2021/0049376 | A1* | 2/2021 | Cui | ....................... G05D 1/0238 |
| 2021/0138640 | A1* | 5/2021 | Choi | ..................... G05D 1/0221 |
| 2023/0091839 | A1* | 3/2023 | Kim | ........................ G01B 11/25 700/245 |

FOREIGN PATENT DOCUMENTS

| | | |
|---|---|---|
| CN | 108415420 A | 8/2018 |
| CN | 110051292 A | 7/2019 |
| CN | 110558902 A | 12/2019 |
| CN | 110794831 A | 2/2020 |
| CN | 110989630 A | 4/2020 |
| CN | 111090277 A | 5/2020 |
| CN | 111714034 A | 9/2020 |
| KR | 20180075176 A | 7/2018 |
| KR | 20190101326 A | 8/2019 |
| WO | 2004081683 A1 | 9/2004 |

OTHER PUBLICATIONS

Chinese Office Action dated Apr. 1, 2021, as received in application No. 202010421334.1.

Chinese Office Action dated Aug. 30, 2023, as received in application No. 202180005420.7.

* cited by examiner

METHOD AND SYSTEM FOR CONTROLLING AUTONOMOUS MOBILE ROBOT, AND AUTONOMOUS MOBILE ROBOT

CROSS REFERENCE TO RELATED APPLICATION

This application is a national phase entry under 35 U.S.C § 371 of International Application No. PCT/CN2021/086582, filed on Apr. 12, 2021, which claims priority to Chinese Patent application Ser. No. 20/201,0421334.1 titled "METHOD AND SYSTEM FOR CONTROLLING AUTONOMOUS MOBILE ROBOT, AND AUTONOMOUS MOBILE ROBOT" and filed on May 18, 2020, the entire contents of which are incorporated herein by reference.

TECHNICAL FIELD

The present disclosure relates to the field of automation technology, and more particularly, to a method and system for controlling an autonomous mobile robot, and the autonomous mobile robot.

BACKGROUND

When a room is cleaned, a current autonomous mobile robot may generally build a map of a region to be cleaned in advance, then may plan a cleaning path in the built map, and subsequently may perform cleaning according to the planned cleaning path.

In a current indoor environment, there may be some line objects that may be, for example, network cables, power cables, headphone cables, speaker cables, etc. These line objects may adversely affect the autonomous mobile robot to varying degrees. For example, the autonomous mobile robot may be entangled by the line objects when passing through these line objects. At present, the autonomous mobile robot entangled by the line objects may be disentangled from the line objects by reversely rotating side brushes or performing an escape action. However, in practical applications, due to different materials and shapes of the line objects, it is easy to cause the autonomous mobile robot to fail to escape, thereby adversely affecting a normal cleaning process.

SUMMARY

An objective of the present disclosure is to provide a method and system for controlling an autonomous mobile robot, and the autonomous mobile robot. The autonomous mobile robot can be effectively prevented from being entangled by a line object.

To achieve the above objective, one aspect of the present disclosure provides a method for controlling an autonomous mobile robot. The method includes: when cleaning in a current region, recognizing, by the autonomous mobile robot, information of a line object appearing in a cleaning path, where the information at least includes one of pose information of the line object, a length of the line object, and a cross-sectional radius of the line object; and determining a target control strategy matched with the recognized information from preset control strategies, and causing the autonomous mobile robot to execute the target control strategy.

To achieve the above objective, another aspect of the present disclosure also provides a system for controlling an autonomous mobile robot. The system includes: a line information recognition unit configured to recognize information of a line object appearing in a cleaning path when the autonomous mobile robot performs cleaning in a current region, where the information at least comprises one of pose information of the line object, a length of the line object, and a cross-sectional radius of the line object; and a strategy execution unit configured to determine a target control strategy matched with the recognized information from preset control strategies, and to cause the autonomous mobile robot to execute the target control strategy.

To achieve the above objective, yet another aspect of the present disclosure also provides an autonomous mobile robot, which includes a memory and a processor, where the memory is configured to store a computer program. The computer program, when executed by the processor, is configured for: when the autonomous mobile robot performs cleaning in a current region, recognizing information of a line object appearing in a cleaning path, where the information at least includes one of pose information of the line object, a length of the line object, and a cross-sectional radius of the line object; and determining a target control strategy matched with the recognized information from preset control strategies, and causing the autonomous mobile robot to execute the target control strategy.

As can be seen from the above, according to technical solutions provided by one or more embodiments of the present disclosure, during cleaning, the autonomous mobile robot may obtain information of the line object that appears in a cleaning path. The information of the line object may at least include one of pose information of the line object, a length of the line object, and a cross-sectional radius of the line object. The pose information may represent a placement position of the line object in a cleaned region. For the recognized information, the autonomous mobile robot may select a control strategy suitable for the current line object from a plurality of preset control strategies. In this way, corresponding control strategies may be selected to avoid line objects that are randomly placed and have different shapes in practical applications, such that the autonomous mobile robot is prevented from being entangled by the line objects, thereby improving efficiency of region cleaning.

BRIEF DESCRIPTION OF THE DRAWINGS

To describe the technical solutions of embodiments of the present disclosure more clearly, the accompanying drawings required for describing the embodiments will be briefly introduced below. Apparently, the accompanying drawings in the following description are merely some embodiments of the present disclosure. To those of ordinary skills in the art, other accompanying drawings may also be derived from these accompanying drawings without creative efforts.

DETAILED DESCRIPTION

To make the objectives, technical solutions, and advantages of the present disclosure clearer, the technical solutions of the present disclosure will be described clearly and completely below with reference to the embodiments and the corresponding accompanying drawings of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
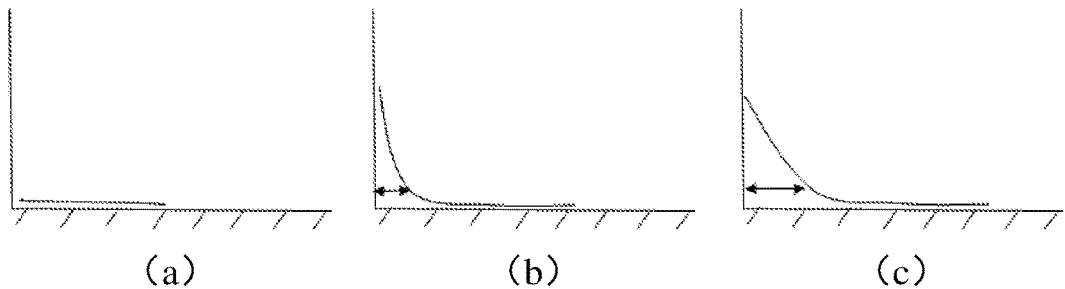
FIG. 1(a) to (c) are schematic diagrams of position division of a line object in an embodiment of the present disclosure.

In practical applications, indoor placement of the line object may generally have several forms as shown in FIG. 1. Specifically, in FIG. 1(a), the line object may be completely placed on the floor. Of course, the line object may also have various forms on the floor. For example, the line object may be placed in a bent manner, linearly, or in a coiled manner. The placement manner of the line object completely placed on the floor is not limited in the present disclosure. In FIG. 1(b) and FIG. 1(c), a part of the line object may be hung on the wall, and other part of the line object may be placed on the floor. The difference is that in FIG. 1(b), the space between part of the line object hung on the wall and the to-be-cleaned floor is smaller and does not allow the autonomous mobile robot to pass through. In FIG. 1(c), the space between part of the line object hung on the wall and the to-be-cleaned floor is larger and allows the autonomous mobile robot to pass through normally. In the present disclosure, the placement position of the line object may be roughly divided into the above three situations.

Figure 2:
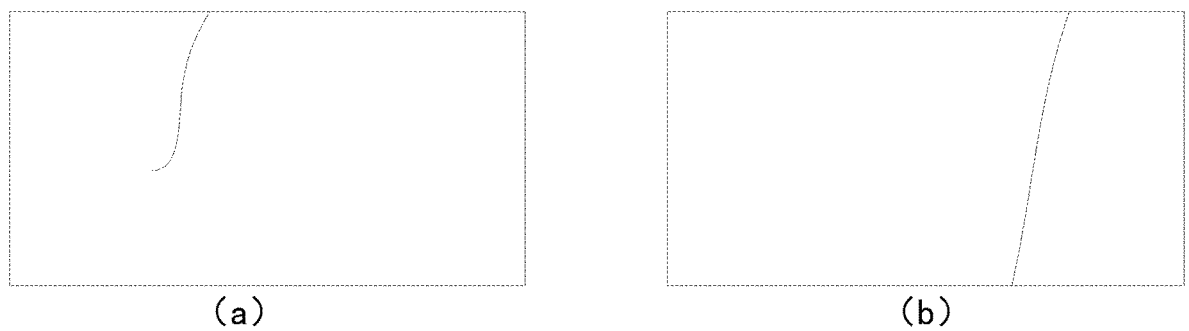
FIGS. 2(a) and (b) are schematic diagrams of length division of a line object in an embodiment of the present disclosure.

In practical applications, the length of the line object generally may also adversely affect the cleaning process of the autonomous mobile robot. Referring to FIG. 2, the line objects may be divided into the line objects that cause region division and the line objects that do not cause region division according to different lengths. Specifically, in FIG. 2(a), the line object is shorter and does not divide the region to be cleaned into two closed regions. In FIG. 2(b), the line object is longer and has divided the region to be cleaned into left and right closed regions. In the present disclosure, the length of the line object may be roughly divided into the above two situations.

In practical applications, the thickness of the line object may also adversely affect the cleaning process of the autonomous mobile robot. The thickness of the line object may be represented by the cross-sectional radius of the line object. Of course, those skilled in the art may easily think that the thickness of the line object may also be represented by the area or diameter of the cross section. It should be noted that parameters that can represent the thickness of the line object should fall within the scope of protection of the present disclosure. If the line object is thicker, although it may not cause the autonomous mobile robot to be entangled, it may cause the autonomous mobile robot to fail to stride across the line object successfully. However, if the line object is thinner, the autonomous mobile robot may easily stride across the line object, but it may be entangled during striding across. For some line objects with certain sizes, the autonomous mobile robot may also easily stride across them just without being entangled. Therefore, for the line objects with different thicknesses, the autonomous mobile robot may also select different control strategies.

As can be seen from the above, in practical applications, the line objects may be divided according to the placement positions, the lengths, and the cross-sectional radii. For different types of line objects, the autonomous mobile robot should also adopt the corresponding control strategies, such that the autonomous mobile robot can be effectively prevented from being entangled by the line objects under the premise of ensuring the cleaning efficiency. The placement position of the line object may serve as the pose information of the line object, and the length and cross-sectional radius of the line object may serve as the attribute information of the line object. The pose information and attribute information of the line object may be collectively referred to as the information of the line object in the present disclosure. In practical applications, the autonomous mobile robot may determine the appropriate control strategy in combination with various information of the line object, or only according to any kind of the information.

It should be noted that with the continuous enrichment of the indoor environments, there may be more situations in the placement position of the line object and more changes in the shape of the line object. The above division of the line objects according to the limited several kinds of pose information or attribute information is just the example for the convenience of understanding the technical solution of the present disclosure, and does not indicate that the technical solution of the present disclosure can only be applied to the scenes exemplified above. Those skilled in the art should know that under the premise of understanding the essence of the technical solution of the present disclosure, the reasonable changes to the solution and the expansion of the application scenes should also fall within the scope of protection of the present disclosure.

Figure 3:
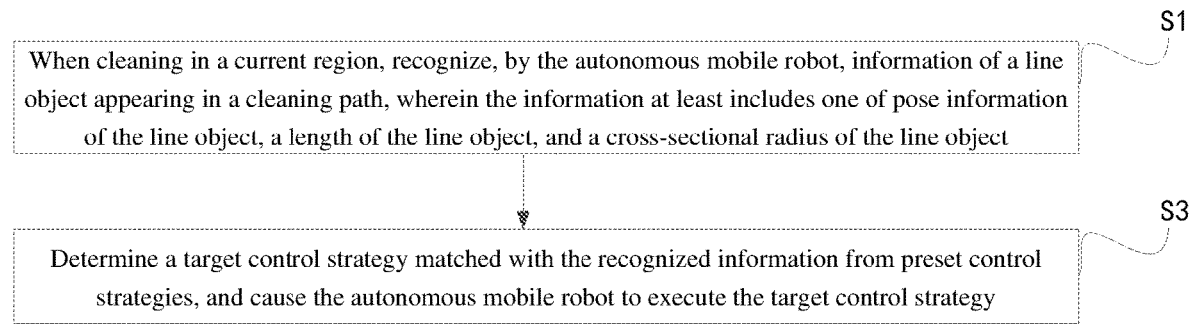
FIG. 3 is a schematic diagram of a method for controlling an autonomous mobile robot in an embodiment of the present disclosure.

Referring to FIG. 3, the method for controlling the autonomous mobile robot provided by one embodiment of the present disclosure may include following steps.

S1: when the autonomous mobile robot performs cleaning in a current region, recognizing information of a line object appearing in a cleaning path, where the information at least includes one of pose information of the line object, a length of the line object, and a cross-sectional radius of the line object.

In this embodiment, the autonomous mobile robot may build the map of the region to be cleaned by means of laser-direct-structuring (LDS) or visual simultaneous localization and mapping (VSLAM) technology. Next, for the built map, the autonomous mobile robot may plan the cleaning path and perform cleaning according to the cleaning path.

In practical applications, after the map of the region to be cleaned is built, the user may mark the placement position, length, and cross-sectional radius of the line object in the map according to the actual environment. In this way, the autonomous mobile robot may directly recognize the information of the line object after the map marked with the information of the line object is analyzed. Subsequently, according to the current position of the autonomous mobile robot during cleaning, the information of the line object at the current position may be recognized.

In this embodiment, the information of the above line object may include one or more of the pose information of the line object, the length of the line object, and the cross-sectional radius of the line object. During determination of the control strategy suitable for the autonomous mobile robot, the determination may be performed according to one or more kinds of the information. Of course, with the continuous progress of technology, the line object may also have other information. For example, the information of the line object may further include the material of the line object, the softness of the line object, etc. Those skilled in the art should know that under the premise of understanding the essence of the technical solution of the present disclosure, the reasonable changes to the solution and the expansion of the application scenes should also fall within the scope of protection of the present disclosure.

In another embodiment, to simplify the operation steps of the user, the information of the line object may be obtained in real time by the autonomous mobile robot during cleaning. Specifically, a three-dimensional (3D) sensor (such as a structured light sensor or a depth camera) may be installed on the autonomous mobile robot. Environmental images near the autonomous mobile robot may be collected via the 3D sensor. For the collected environmental images, matched image features may be obtained by ways of extracting the image features, performing feature matching by means of the image features, etc. Next, sparse reconstruction may be performed on the basis of the matched image features to obtain the camera position and attitude of each image. Finally, dense reconstruction may be performed on the basis of the camera position and attitude to obtain the dense point cloud. The dense point cloud may be configured for reconstructing the three-dimensional scene to recognize the information of the line object appearing in the cleaning path.

In this embodiment, after the pose information of the line object is recognized, it may be determined whether the current line object is completely placed on the floor or partially hung on the wall. Further, after it is determined that part of the line object is hung on the wall, it may be determined whether the space between part of the line object hung on the wall and the to-be-cleaned floor allows the autonomous mobile robot to pass through normally. Specifically, an outline dimension of the autonomous mobile robot may be set inside the autonomous mobile robot. By comparing the outline dimension with the space between the line object and the to-be-cleaned floor, it may be determined whether the space allows the autonomous mobile robot to pass through normally.

In this embodiment, after the attribute information of the line object is recognized, in combination with the built indoor map, it may be determined whether the line object divides the region to be cleaned into two regions, and it may be determined whether the cross-sectional radius of the line object is smaller or larger.

S3: determining a target control strategy matched with the recognized information from preset control strategies, and causing the autonomous mobile robot to execute the target control strategy.

In this embodiment, for different line objects, the plurality of control strategies may be preset. For the line object that appears currently, the autonomous mobile robot may select the appropriate target control strategy from the plurality of preset control strategies in combination with the information of the line object. By executing the target control strategy, the autonomous mobile robot may also be prevented from being entangled by or blocked by the line object under the premise of ensuring the cleaning efficiency.

Specifically, the control strategy may be determined in combination with the actual situation encountered by the autonomous mobile robot during cleaning. For example, a control strategy may be that the autonomous mobile robot disables the cleaning function and strides across the line object. The cleaning function of the autonomous mobile robot may vary according to the actual model number of the autonomous mobile robot. For example, during cleaning, the common autonomous mobile robot may clean up dust and debris via the side brushes on two sides, and it may also suck the dust and the small particles of debris into the dustbin via the dust suction assembly. In this way, when the cleaning function is disabled, the side brushes on the two sides may be turned off, such that the side brushes on the two sides temporarily stop working, and the dust suction assembly may also be turned off. Another control strategy may be that the autonomous mobile robot performs cleaning along the edge of the line object and turns off the side brush close to a side of the line object. Another control strategy may be that the autonomous mobile robot passes through the position below the hung line object and turns off the side brush close to the side of the line object. Another control strategy may be that the autonomous mobile robot directly turns around and performs cleaning in the opposite direction when the line object is encountered on the cleaning path. In addition, if there is no need to adopt the control strategy, the autonomous mobile robot may continue to perform cleaning according to the currently planned cleaning path and cleaning mode. For example, for the line object that is unlikely to cause the entanglement, the autonomous mobile robot may ignore the line object and still maintain the current cleaning path and cleaning mode to perform cleaning. If the line object is encountered on the cleaning path, the autonomous mobile robot may stride across the line object under the premise of not disabling the cleaning function.

Of course, in practical applications, there may be more control strategies, which are not exemplified one by one here. Those skilled in the art should know that under the premise of understanding the essence of the technical solution of the present disclosure, the reasonable changes to the solution and the expansion of the application scenes should also fall within the scope of protection of the present disclosure.

In this embodiment, after the plurality of control strategies are predetermined, the corresponding target control strategy may be selected and executed according to the information of the line object appearing in the current cleaning path. For example, if the pose information of the line object represents that the line object is completely placed on the floor, the autonomous mobile robot may choose to perform cleaning along the edge of the line object and turn off the side brush close to the side of the line object. In some other scenes, the autonomous mobile robot may also choose to disable the cleaning function and stride across the line object. Of course, the autonomous mobile robot may also choose to directly turn around and continue to perform cleaning in the opposite direction. For another example, if the pose information of the line object represents that part of the line object is hung on the wall, and the space between part of the line object hung on the wall and the to-be-cleaned floor allows the autonomous mobile robot to pass through, the autonomous mobile robot may directly pass through the space and turn off the side brush close to the side of the line object.

In one embodiment, the target control strategy adopted by the autonomous mobile robot may be related to the current cleaning mode of the autonomous mobile robot, in addition to the information of the line object. In practical applications, the cleaning modes of the autonomous mobile robot may be divided into edgewise cleaning and non-edgewise cleaning. For the two different cleaning modes, different control strategies may be selected when the line object is encountered. In view of this, in this embodiment, the current cleaning mode of the autonomous mobile robot may be recognized, and a target control strategy may be determined from a preset control strategy according to the cleaning mode and the information.

Figure 4:
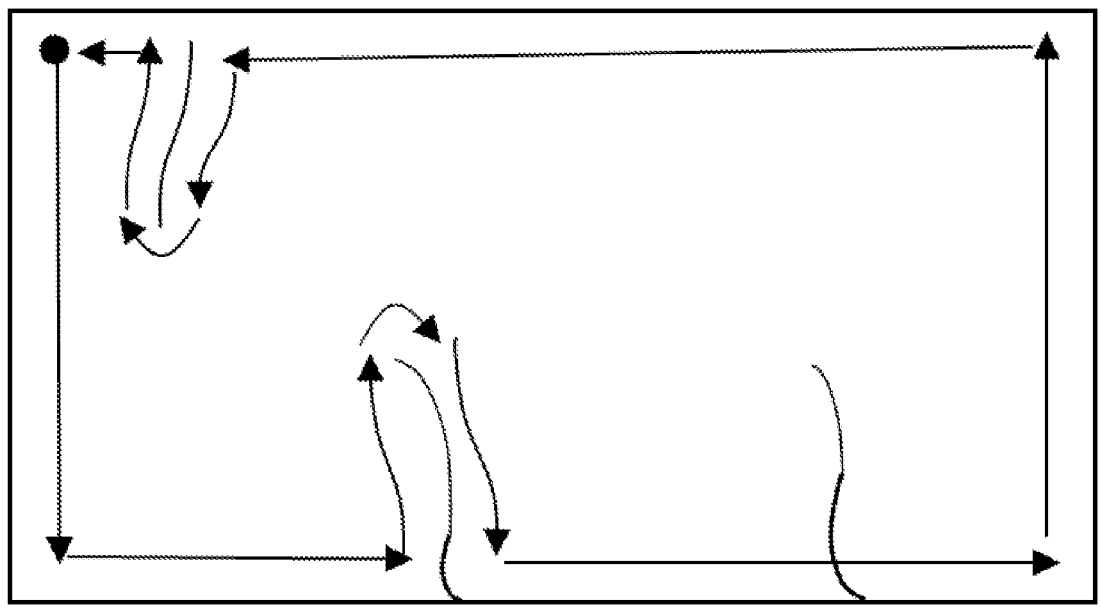
FIG. 4 is a schematic diagram of a path for edgewise cleaning by an autonomous mobile robot in an embodiment of the present disclosure.

Specifically, referring to FIG. 4, in one embodiment, if the current cleaning mode of the autonomous mobile robot represents that the autonomous mobile robot is performing edgewise cleaning, the pose information of the line object may be analyzed when the line object is encountered in the cleaning path. If the pose information represents that the line object is completely placed on the floor, the target control strategy selected by the autonomous mobile robot may control the autonomous mobile robot to perform cleaning along the edge of the line object and to turn off the side brush close to the side of the line object. In this case, regardless of whether the line object divides the region to be cleaned into the two regions, the autonomous mobile robot may perform cleaning along the edge of the line object. But if the line object does not divide the region to be cleaned into the two regions, during cleaning in the current region, the autonomous mobile robot may generally perform cleaning on the two sides of the line object. However, if the line object divides the region to be cleaned into the two regions, during cleaning in the current region, the autonomous mobile robot can only perform cleaning on a side of the line object, and the other side needs to be cleaned in the next region obtained by division.

Referring to FIG. 4, in one embodiment, when the sweeper robot performs edgewise cleaning, if the pose information of the line object represents that part of the line object is hung on the wall, the autonomous mobile robot may determine whether the space between part of the line object hung on the wall and the to-be-cleaned floor allows the autonomous mobile robot to pass through according to the result pre-marked by the user, or in combination with its outline dimension. Subsequently, the appropriate target control strategy may be determined according to the determination result. Specifically, if the space allows the autonomous mobile robot to pass through, the determined target control strategy may be configured for controlling the autonomous mobile robot to pass through the space and to turn off the side brush close to the side of the line object. However, if the space does not allow the autonomous mobile robot to pass through, the determined target control strategy may be kept consistent with the line object completely placed on the floor, and is configured for controlling the autonomous mobile robot to perform cleaning along the edge of the line object and to turn off the side brush close to the side of the line object.

Figure 5:
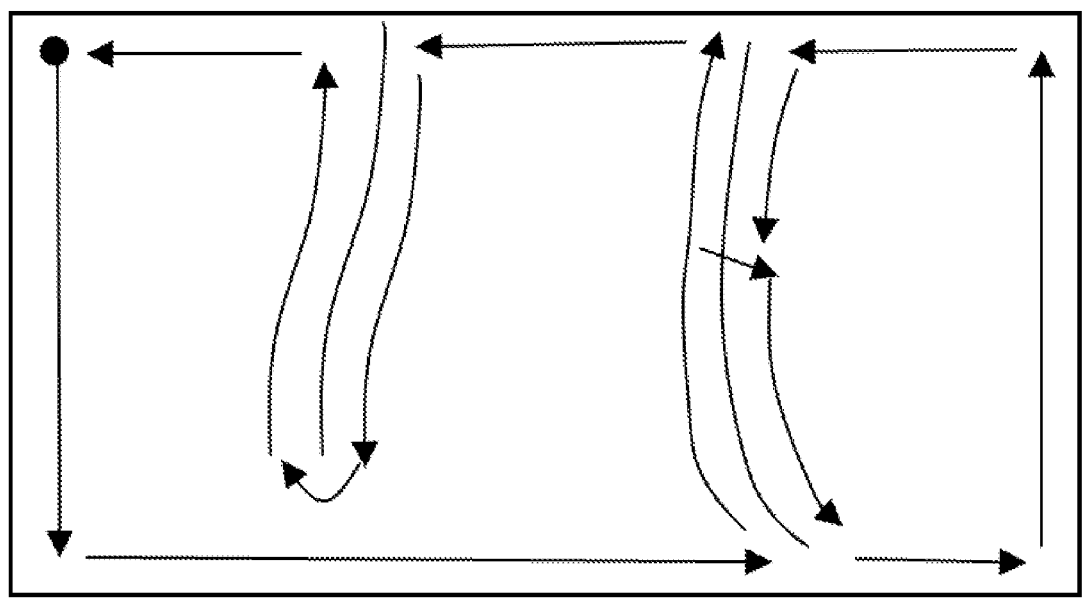
FIG. 5 is a schematic diagram of cleaning line objects with different lengths by an autonomous mobile robot in an embodiment of the present disclosure.

Referring to FIG. 5, in one embodiment, if the attribute information of the current line object represents that the line object is longer, the current region and the next region are separated from each other, such that the current region may constitute a closed region, the autonomous mobile robot may complete the cleaning process in the current region according to the set cleaning path and cleaning mode. In this case, because the next region also belongs to the region to be cleaned, the autonomous mobile robot needs to stride across from the line object to the next region to perform cleaning. Specifically, during cleaning in the current region, the autonomous mobile robot may record the height of the line object away from the floor, such that the lowest point of the line object away from the to-be-cleaned floor may be determined. After the cleaning of the current region is completed, the autonomous mobile robot may run to the above lowest point of the line object and stride across from the lowest point to the next region to clean the next region. When the autonomous mobile robot strides across from the lowest point, the target control strategy selected by the autonomous mobile robot may disable the cleaning function. When the next region is reached, the autonomous mobile robot may enable the cleaning function and start cleaning.

In practical applications, after the cleaning of the current region is completed, the autonomous mobile robot may analyze the lowest point of the line object between the current region and the next region, and then may plan the shortest path from the current position to the lowest point according to the built cleaning map. Specifically, the shortest path may be planned by means of a rapidly exploring random trees (RRT) algorithm, a Dijkstra algorithm, or an A*(A-Star) algorithm. In the shortest path, the indoor obstacles may be avoided. After the shortest path is planned, the autonomous mobile robot may move to the lowest point of the line object along the shortest path at the current position where the cleaning is completed.

During selection of the target control strategy, the autonomous mobile robot performs analysis generally on the basis of the pose information and length of the line object. In practical applications, the cross-sectional radius of the line object may also affect the selection of the target control strategy. Specifically, the cross-sectional radius of the line object may be roughly divided into three radius ranges. The three radius ranges may be increased sequentially. For example, the first radius range may be the interval less than R1, the second radius range may be the interval greater than or equal to R1 and less than R2, and the third radius range may be the interval greater than or equal to R2. R1 and R2 may be radius thresholds obtained by summarizing the cross-sectional radii of the current common line objects. The objective of such division is that the line object in the first radius range may generally cause the autonomous mobile robot to be entangled. For example, the line object in the first radius range may be the headphone cable, the sewing thread, etc. The line object in the second radius range generally may not cause the autonomous mobile robot to be entangled, and may also not hinder the normal running of the autonomous mobile robot. For example, the line object in the second radius range may be, for example, the network cable, the television power cable, the computer charging cable, etc. The line object in the third radius range may also not cause the autonomous mobile robot to be entangled, but the autonomous mobile robot generally cannot stride across the line object. For example, the line object in the third radius range may be the thicker cable or the power cable for the large household appliance. Of course, in practical applications, the cross-sectional radius of the line object may also be subdivided into more radius ranges. But those skilled in the art should know that under the premise of understanding the essence of the technical solution of the present disclosure, the reasonable changes to the solution and the expansion of the application scenes should also fall within the scope of protection of the present disclosure.

In one embodiment, for part of the line object hung on the wall, the appropriate control strategy may be selected in the manner described above. For the line object completely placed on the floor, the more suitable target control strategy may be determined in combination with the current cleaning mode of the autonomous mobile robot and the target radius range where the cross-sectional radius of the line object is located.

Figure 6:
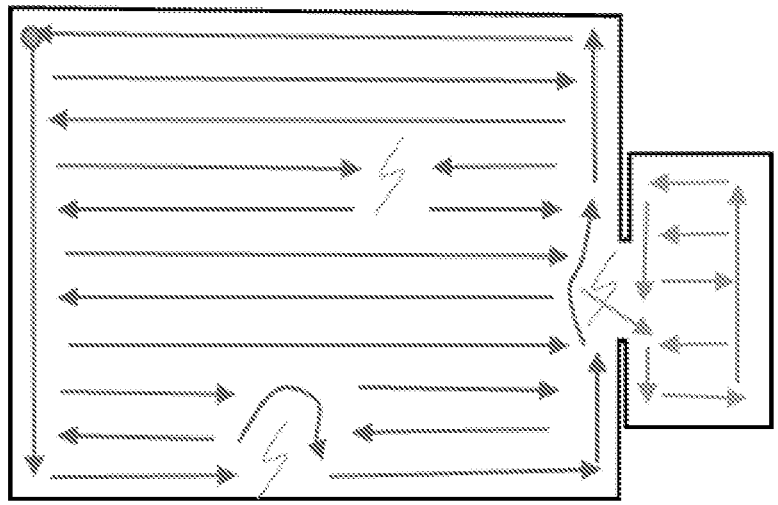
FIG. 6 is a schematic diagram of a cleaning path for a line object in a first radius range according to an embodiment of the present disclosure.
Figure 7:
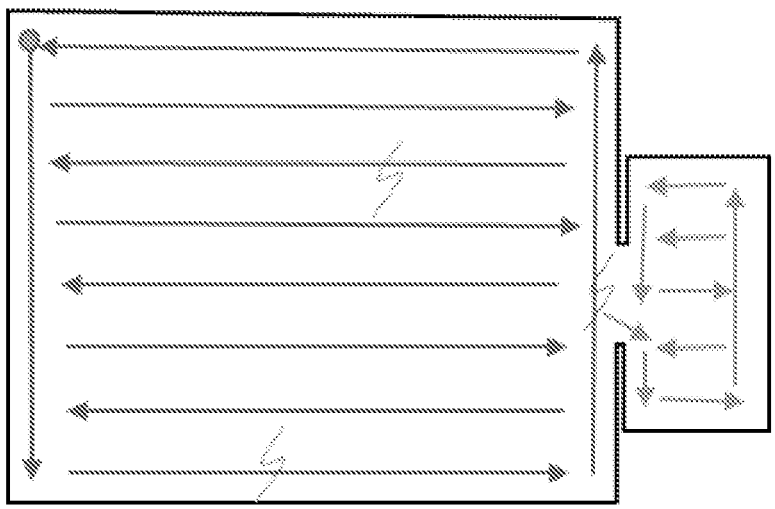
FIG. 7 is a schematic diagram of a cleaning path for a line object in a second radius range according to an embodiment of the present disclosure.
Figure 8:
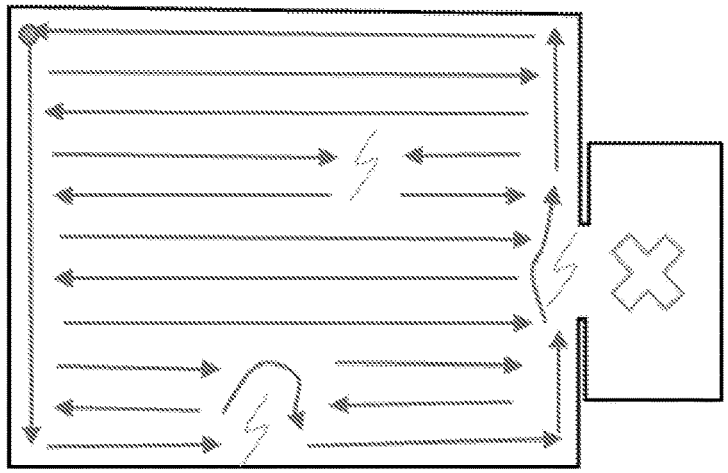
FIG. 8 is a schematic diagram of a cleaning path for a line object in a third radius range according to an embodiment of the present disclosure.

Specifically, referring to FIG. 6 to FIG. 8, when the autonomous mobile robot is in the edgewise cleaning mode, if the target radius range of the line object that appears currently is the above first radius range or third radius range, this indicates that the autonomous mobile robot should not directly stride across the line object, because this may cause the autonomous mobile robot to be entangled, or cause the autonomous mobile robot not to complete the striding across action. In this case, the selected target control strategy may be configured for controlling the autonomous mobile robot to perform cleaning along the edge of the line object and to turn off the side brush close to the side of the line object (referring to FIG. 6 and FIG. 8). However, if the target radius range of the line object is the second radius range, this indicates that the line object generally may not cause the autonomous mobile robot to be entangled, and the autonomous mobile robot may also easily stride across the line object. In this case, the determined target control strategy may be configured for controlling the autonomous mobile robot to stride across the line object without disabling the cleaning function, and to maintain the currently planned cleaning path and cleaning mode to perform cleaning (referring to FIG. 7).

In another embodiment, if the autonomous mobile robot has completed edgewise cleaning and further performs S-shaped cleaning, when the line object is encountered in this case, if the target radius range of the line object is the first radius range or the third radius range, this indicates that the autonomous mobile robot should not directly stride across the line object, and the selected target control strategy may be configured for controlling the autonomous mobile robot to perform cleaning along the direction opposite to the current moving direction, that is, to perform S-shaped cleaning in the opposite direction (as shown in FIG. 6 and FIG. 8).

However, if the target radius range of the line object is the second radius range, the autonomous mobile robot may generally ignore the line object and directly stride across the line object. But in practical applications, it is further needed to perform comprehensive determination in combination with the position of the line object in the region to be cleaned. Specifically, it may be determined whether the pose information of the line object represents that the line object separates different cleaned regions from each other, and the corresponding target control strategy may be determined according to the determination result. Specifically, referring to FIG. 7, if the pose information of the line object does not represent that the line object separates the different cleaned regions from each other, but the line object is only positioned in the middle of the current region, the determined target control strategy may be configured for controlling the autonomous mobile robot to directly stride across the line object, and to maintain the currently planned cleaning path and cleaning mode to perform cleaning. However, if the pose information of the line object represents that the line object separates the different cleaned regions from each other, generally only after the cleaning of the current region is completed, the autonomous mobile robot may enter the next region to perform cleaning, so it should not directly stride across the line object in this case (otherwise, the autonomous mobile robot may enter the next region), and the determined target control strategy may be configured for controlling the autonomous mobile robot to perform cleaning along the direction opposite to the current moving direction, that is, to continue performing S-shaped cleaning in the current region.

In one embodiment, if the current region and the next region in the region to be cleaned are separated from each other by the line object, after the cleaning of the current region is completed, the autonomous mobile robot needs to try to enter the next region to perform cleaning. When the autonomous mobile robot enters the next region, it needs to stride across the line object. In this case, the target radius range where the cross-sectional radius represented by the attribute information of the line object is located may be recognized, and the target control strategy may be determined according to the target radius range.

Specifically, when the target radius range is the first radius range, this indicates that the line object is thinner, which is easy to cause the autonomous mobile robot to be entangled. In this case, the selected target control strategy may control the autonomous mobile robot to move to the lowest point of the line object away from the to-be-cleaned floor, and to stride across from the lowest point to the next region after the cleaning function is disabled, to clean the next region. The reason for disabling the cleaning function is that the possibility of entanglement of the autonomous mobile robot may be reduced.

When the target radius range is the second radius range, the autonomous mobile robot may ignore the line object without disabling the cleaning function, so the selected target control strategy may control the autonomous mobile robot to move to the lowest point of the line object away from the to-be-cleaned floor, and to stride across from the lowest point to the next region under the condition of maintaining the currently planned cleaning mode, to clean the next region.

When the target radius range is the third radius range, this indicates that it is difficult for the autonomous mobile robot to stride across the line object. In this case, to avoid the damage to the autonomous mobile robot, the determined target control strategy may be configured for controlling the autonomous mobile robot to stop cleaning the next region. Meanwhile, the autonomous mobile robot may send out the alarm information to remind the householder to move away the line object before the next region is cleaned.

Figure 9:
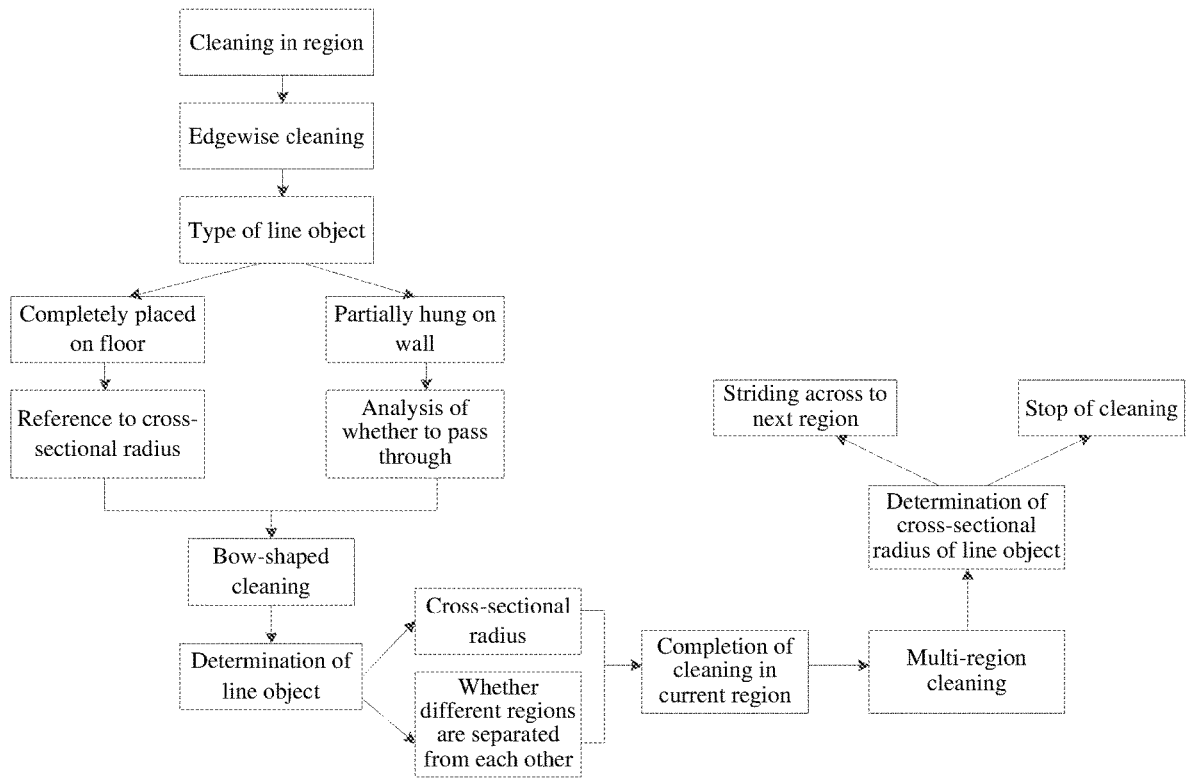
FIG. 9 is a cleaning flowchart of an autonomous mobile robot in one application example of the present disclosure.

Referring to FIG. 9, in one application scene, the autonomous mobile robot may enable the multi-region cleaning mode for the built indoor map, and during cleaning, it may perform edgewise cleaning first and then perform S-shaped cleaning.

During edgewise cleaning, when the line object is found, it may be determined whether the line object is completely placed on the floor or partially hung on the wall. If the line object is completely placed on the floor, the cross-sectional radius of the line object may be further determined, and then the autonomous mobile robot chooses whether to directly stride across the line object or perform cleaning along the edge of the line object according to the cross-sectional radius. If the line object is partially hung on the wall, the space between the hung part and the to-be-cleaned floor may be analyzed, and the autonomous mobile robot determines whether to directly pass through the space or perform cleaning along the edge of the line object.

After the edgewise cleaning is completed, the autonomous mobile robot may continue to perform S-shaped cleaning in the current region. During S-shaped cleaning, if the line object is encountered, the cross-sectional radius of the line object and whether the two regions are separated from each other may be analyzed. Subsequently, according to the determination result, the autonomous mobile robot may choose to directly stride across the line object or turn around and continue to perform-bow shaped cleaning along the opposite direction.

After the cleaning of the current region is completed, because the multi-region cleaning function is enabled, the next region separated by the line object may be cleaned. In this way, the autonomous mobile robot may move from the current position to the lowest point of the line object, and when the cross-sectional radius of the line object is suitable for striding across, it strides across from the lowest point to the next region to perform cleaning. If the cross-sectional radius of the line object is not suitable for striding across, the function of multi-region cleaning may be disabled, and the alarm is given to the householder to remind the householder to move away the line object before the next region is cleaned.

Figure 10:
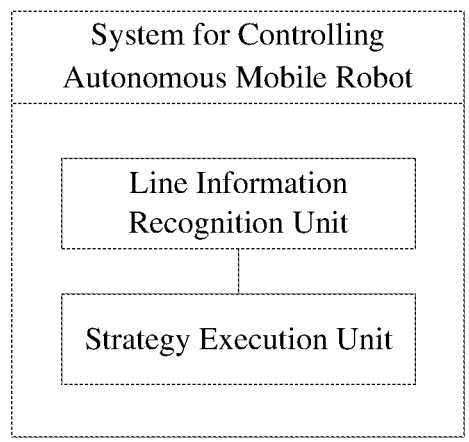
FIG. 10 is a schematic diagram of functional modules of a system for controlling an autonomous mobile robot in one embodiment of the present disclosure.

Referring to FIG. 10, the present disclosure also provides a system for controlling an autonomous mobile robot, and the system includes:
   a line information recognition unit configured to recognize information of a line object appearing in a cleaning path when the autonomous mobile robot performs cleaning in a current region, wherein the information at least comprises one of pose information of the line object, a length of the line object, and a cross-sectional radius of the line object; and
   a strategy execution unit configured to determine a target control strategy matched with the recognized information from preset control strategies, and to cause the autonomous mobile robot to execute the target control strategy.

In one embodiment, the strategy execution unit includes:
   a strategy determination module configured to recognize a current cleaning mode of the autonomous mobile robot, and to determine the target control strategy from the preset control strategies according to the cleaning mode and the information, wherein the cleaning mode is configured for representing whether the autonomous mobile robot performs edgewise cleaning.

In one embodiment, the cross-sectional radius of the line object is divided into a plurality of radius ranges; and the strategy execution unit includes:
   a radius reference module configured to recognize a current cleaning mode of the autonomous mobile robot and a target radius range where the cross-sectional radius is located, and to determine the target control strategy according to the cleaning mode and the target radius range.

In one embodiment, the system also includes:
   a multi-region cleaning unit configured to, when the current region and a next region are separated from each other by the line object, after the autonomous mobile robot completes cleaning of the current region, recognize a target radius range where the cross-sectional radius is located, and determine the target control strategy according to the target radius range.

Figure 11:
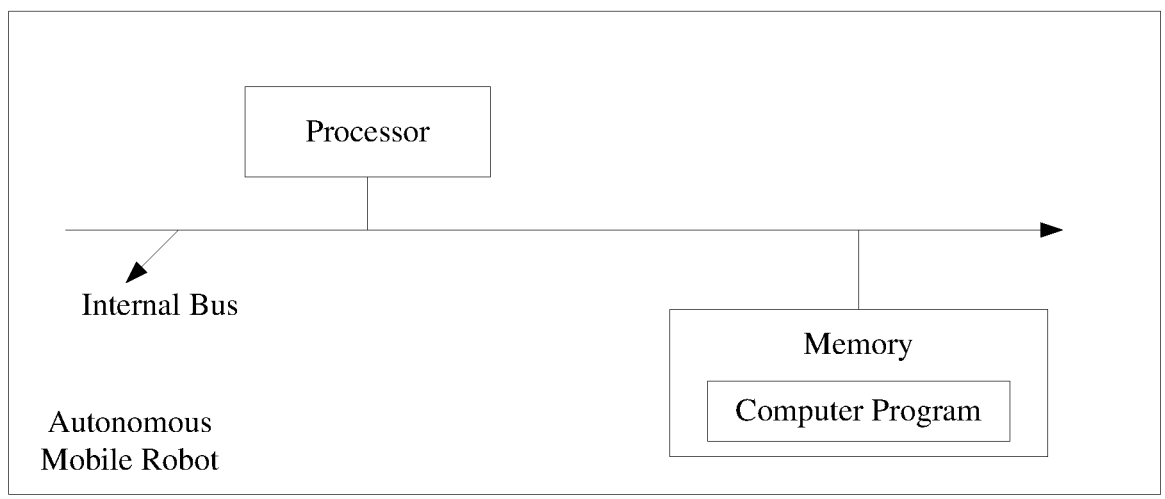
FIG. 11 is a schematic structural diagram of an autonomous mobile robot in an embodiment of the present disclosure.

Referring to FIG. 11, the present disclosure also provides an autonomous mobile robot, which includes a memory and a processor, where the memory is configured to store a computer program, and the computer program, when executed by the processor, is configured for:
   when the autonomous mobile robot performs cleaning in a current region, recognizing information of a line object appearing in a cleaning path, where the information at least includes one of pose information of the line object, a length of the line object, and a cross-sectional radius of the line object; and
   determining a target control strategy matched with the recognized information from preset control strategies, and causing the autonomous mobile robot to execute the target control strategy.

In this embodiment, the memory may include a physical apparatus configured to store information, which is generally digitized and then stored in a medium using electrical, magnetic, or optical methods. The memory may include: an apparatus configured to store information by means of electrical energy, such as RAM or ROM; an apparatus configured to store information by means of magnetic energy, such as hard disk, floppy disk, magnetic tape, magnetic core memory, magnetic bubble memory, or U disk; and an apparatus configured to store information using optical means, such as CD or DVD. Of course, there are other types of memories, such as quantum memories or graphene memories.

In this embodiment, the processor may be implemented in any suitable manner. For example, the processor may take the form of, for example, a microprocessor or a processor, and a computer-readable medium storing computer-readable program codes (for example, software or firmware) executable by the (micro)processor, logic gates, switches, application specific integrated circuits (ASICs), programmable logic controllers and embedded microcontrollers, etc.

The various embodiments in this specification are described in a progressive manner, and the same or similar parts between the various embodiments can be referred to each other, and each embodiment focuses on the differences from other embodiments.

As can be seen from the above, according to technical solutions provided by one or more embodiments of the present disclosure, during cleaning, the autonomous mobile robot may obtain information of the line object that appears in a cleaning path. The information of the line object may at least include one of pose information of the line object, a length of the line object, and a cross-sectional radius of the line object. The pose information may represent a placement position of the line object in a cleaned region. For the recognized information, the autonomous mobile robot may select a control strategy suitable for the current line object from a plurality of preset control strategies. In this way, corresponding control strategies may be selected to avoid line objects that are randomly placed and have different shapes in practical applications, such that the autonomous mobile robot is prevented from being entangled by the line objects, thereby improving efficiency of region cleaning.

Those skilled in the art should realize that the embodiments of the present disclosure may be provided as a method, a system or a computer program product. Therefore, the present disclosure may use forms of a full hardware embodiment, a full software embodiment, or an embodiment in combination of software and hardware aspects. Furthermore, the present disclosure may use forms of computer program products implemented on one or more computer storage media (including but not limited to a magnetic disk memory, a CD-ROM, an optical memory or the like) which includes a computer program code.

The present disclosure is described with reference to flowcharts and/or block diagrams according to the method, device (system) and a computer program product of the embodiments of the present disclosure. It is to be understood that each flow and/or block in the flowchart and/or block diagram as well as combination of flow and/or block in the flowchart and/or block diagram may be realized by computer program instructions. These computer program instructions may be provided for a general-purpose computer, a special-purpose computer, an embedded processor or processors of other programmable data processing terminal equipment to generate a machine, to generate an apparatus configured to implement designated functions in one or more flows of a flowchart and/or one or more blocks of a block diagram by means of instructions executed by a computer or a processor of other programmable data processing equipment.

These computer program instructions may also be stored in a computer-readable memory that can guide a computer or other programmable data processing equipment to work in a particular way, such that the instructions stored in the computer-readable memory generate a manufactured product including a command device that implements the designated functions in one or more flows of a flowchart and/or one or more blocks of a block diagram.

These computer program instructions may also be loaded on a computer or other programmable data processing equipment, to execute a series of operating steps on the computer or other programmable equipment to generate treatments implemented by the computer, such that instructions executed on the computer or other programmable equipment provide steps configured to implement designated functions in one or more flows of a flowchart and/or one or more blocks of a block diagram.

In a typical configuration, a computing device includes one or more CPUs, input-output interfaces, network interfaces and memories.

The memory may include a volatile memory in a computer-readable medium, a random access memory (RAM) and/or a non-volatile memory, such as a read-only memory (ROM) or a flash RAM. The memory is an example of a computer-readable medium.

The computer-readable medium includes a non-volatile medium, a volatile medium, a mobile medium or an immobile medium, which may implement information storage by means of any method or technology. Information may be a computer-readable instruction, a data structure, a module of a program, or other data. Examples of computer storage media comprise but are not limited to a phase change random access memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a compact disc-read only memory (CD-ROM), a digital versatile disc (DVD) or other optical memories, a cartridge magnetic tape, a magnetic tape or magnetic disk memory or other magnetic storage devices or any other non-transmission media, which may be configured to store information that can be accessed by a computing device. As defined herein, computer-readable media do not include transitory media, for example, modulated data signals and carriers.

Furthermore, terms such as "comprise", "include" or other variants thereof are intended to cover a non-exclusive "comprise" such that a process, a method, a merchandise or a device comprising a series of elements not only includes these elements, but also includes other elements not listed explicitly, or also includes inherent elements of the process, the method, the merchandise or the device. In the case of no more restrictions, elements restricted by a sentence "include a . . . " do not exclude the fact that additional identical elements may exist in a process, a method, a merchandise or a device of these elements.

The embodiments described above are only illustrated as embodiments of the present disclosure, and are not intended to limit the present disclosure. To those skilled in the art, various modifications and variations may be made to the present disclosure. All modifications, equivalent substitutions and improvements made within the spirit and principle of the present disclosure shall fall within the protection scope of the claims of the present disclosure.

What is claimed is:

1. A method for controlling an autonomous mobile robot, the method comprising:
when cleaning in a current region, recognizing, by the autonomous mobile robot, information of a line object appearing in a cleaning path,
determining whether the line object divides a region to be cleaned into two closed regions;
in response to the line object divides the region to be cleaned into two closed regions, cleaning the current region;
after cleaning of the current region is completed, the autonomous mobile robot recognizing a target radius range where a cross-sectional radius of the line object is located, and determining a target control strategy according to the target radius range; wherein, the target control strategy comprises striding across the line object to a next region, to clean the next region; the two closed regions comprise the current region and the next region.

2. The method according to claim 1, further comprising determining the target control strategy from preset control strategies, wherein the determining the target control strategy from the preset control strategies comprises:
recognizing a current cleaning mode of the autonomous mobile robot, and determining the target control strategy from the preset control strategies according to the cleaning mode and the information, wherein the cleaning mode is configured for representing whether the autonomous mobile robot performs edgewise cleaning.

3. The method according to claim 2, wherein when the current cleaning mode of the autonomous mobile robot represents that the autonomous mobile robot is performing edgewise cleaning, and pose information represents that the line object is completely placed on a floor, the determined target control strategy is configured for controlling the autonomous mobile robot to perform cleaning along an edge of the line object, and to turn off a side brush close to a side of the line object.

4. The method according to claim 1, wherein when a current cleaning mode of the autonomous mobile robot represents that the autonomous mobile robot is performing edgewise cleaning, and pose information represents that the line object is completely placed on a floor, the determined target control strategy is configured for controlling the autonomous mobile robot to perform cleaning along an edge of the line object, and to turn off a side brush close to a side of the line object.

5. The method according to claim 1, wherein when a current cleaning mode of the autonomous mobile robot represents that the autonomous mobile robot is performing edgewise cleaning, and pose information represents that part of the line object is hung on a wall, it is determined whether space between part of the line object hung on the wall and a to-be-cleaned floor allows the autonomous mobile robot to pass through, and the target control strategy is determined according to a determination result.

6. The method according to claim 5, wherein the target control strategy being determined according to the determination result comprises:
when the space allows the autonomous mobile robot to pass through, the determined target control strategy being configured for controlling the autonomous mobile robot to pass through the space, and to turn off a side brush close to a side of the line object; and
when the space does not allow the autonomous mobile robot to pass through, the determined target control strategy being configured for controlling the autonomous mobile robot to perform cleaning along an edge of the line object, and to turn off the side brush close to the side of the line object.

7. The method according to claim 1, further comprising:
when a length of the line object represents that the current region and the next region are separated from each other by the line object, after cleaning of the current region is completed, the autonomous mobile robot moving to a lowest point of the line object away from a to-be-cleaned floor, and striding across from the lowest point to the next region to clean the next region.

8. The method according to claim 7, wherein when the autonomous mobile robot strides across from the lowest point, the determined target control strategy is configured for controlling the autonomous mobile robot to disable a cleaning function.

9. The method according to claim 7, wherein the autonomous mobile robot moving to the lowest point of the line object away from the to-be-cleaned floor comprises:
after the cleaning of the current region is completed, the autonomous mobile robot planning a shortest path from a current position to the lowest point, and moving to the lowest point along the shortest path.

10. The method according to claim 1, further comprising determining the target control strategy from preset control strategies, wherein the cross-sectional radius of the line object is divided into a plurality of radius ranges; and the determining the target control strategy from the preset control strategies comprises:
recognizing a current cleaning mode of the autonomous mobile robot and the target radius range where the cross-sectional radius is located, and determining the target control strategy according to the cleaning mode and the target radius range.

11. The method according to claim 10, wherein when the cleaning mode represents that the autonomous mobile robot is performing edgewise cleaning:
when the target radius range is a first radius range or a third radius range, the determined target control strategy is configured for controlling the autonomous mobile robot to perform cleaning along an edge of the line object, and to turn off a side brush close to a side of the line object; and
when the target radius range is a second radius range, the determined target control strategy is configured for controlling the autonomous mobile robot to maintain the currently planned cleaning path and cleaning mode to perform cleaning; wherein the first radius range is smaller than the second radius range, and the second radius range is smaller than the third radius range.

12. The method according to claim 10, wherein when the cleaning mode represents that the autonomous mobile robot performs non-edgewise cleaning:
when the target radius range is a first radius range or a third radius range, the determined target control strategy is configured for controlling the autonomous mobile robot to perform cleaning along a direction opposite to a current moving direction; and
when the target radius range is a second radius range, it is determined whether pose information of the line object represents that the line object separates different cleaned regions from each other, and the corresponding target control strategy is determined according to a determination result; wherein the first radius range is smaller than the second radius range, and the second radius range is smaller than the third radius range.

13. The method according to claim 12, wherein the corresponding target control strategy being determined according to the determination result comprises:
when the pose information of the line object does not represent that the line object separates the different cleaned regions from each other, the determined target control strategy being configured for controlling the autonomous mobile robot to maintain the currently planned cleaning path and cleaning mode to perform cleaning; and
when the pose information of the line object represents that the line object separates the different cleaned regions from each other, the determined target control strategy being configured for controlling the autonomous mobile robot to perform cleaning along the direction opposite to the current moving direction.

14. The method according to claim 1, wherein the determining the target control strategy according to the target radius range comprises:
when the target radius range is a first radius range, the determined target control strategy being configured for controlling the autonomous mobile robot to move to a lowest point of the line object away from a to-be-cleaned floor, and to stride across from the lowest point to the next region after a cleaning function is disabled, to clean the next region;
when the target radius range is a second radius range, the determined target control strategy being configured for controlling the autonomous mobile robot to move to the lowest point of the line object away from the to-be-cleaned floor, and to stride across from the lowest point to the next region under a condition of maintaining a currently planned cleaning mode to clean the next region; and
when the target radius range is a third radius range, the determined target control strategy being configured for controlling the autonomous mobile robot to stop cleaning the next region; wherein the first radius range is smaller than the second radius range, and the second radius range is smaller than the third radius range.

15. A system for controlling an autonomous mobile robot, the system comprising a memory and a processor, wherein the memory is configured to store a computer program, and the computer program, when executed by the processor, being configured to:
recognize information of a line object appearing in a cleaning path when the autonomous mobile robot performs cleaning in a current region, determine whether the line object divides a region to be cleaned into two closed regions;

in response to the line object divides the region to be cleaned into two closed regions, clean the current region;

after the autonomous mobile robot completes cleaning of the current region, recognize a target radius range where a cross-sectional radius of the line object is located, and determine a target control strategy according to the target radius range; wherein, the target control strategy comprises striding across the line object to a next region, to clean the next region; the two closed regions comprise the current region and the next region.

16. The system according to claim 15, wherein the processor is further configured to: determine the target control strategy from preset control strategies, recognize a current cleaning mode of the autonomous mobile robot, and to determine the target control strategy from the preset control strategies according to the cleaning mode and the information, wherein the cleaning mode is configured for representing whether the autonomous mobile robot performs edgewise cleaning.

17. The system according to claim 15, wherein the cross-sectional radius of the line object is divided into a plurality of radius ranges; and the processor is further configured to: recognize a current cleaning mode of the autonomous mobile robot and the target radius range where the cross-sectional radius is located, and to determine the target control strategy according to the cleaning mode and the target radius range.

18. An autonomous mobile robot, comprising a memory and a processor, wherein the memory is configured to store a computer program, and the computer program, when executed by the processor, being configured for:

when the autonomous mobile robot performs cleaning in a current region, recognizing information of a line object appearing in a cleaning path, determining whether the line object divides a region to be cleaned into two closed regions;

in response to the line object divides the region to be cleaned into two closed regions, cleaning the current region; wherein, the two closed regions comprise the current region and a next region;

after cleaning of the current region is completed, recognizing a target radius range where a cross-sectional radius of the line object is located, and determine a target control strategy according to the target radius range; wherein, the target control strategy comprises striding across the line object to the next region, to clean the next region.

* * * * *